US011568757B1

(12) United States Patent
Lehman et al.

(10) Patent No.: US 11,568,757 B1
(45) Date of Patent: Jan. 31, 2023

(54) AFFECTIVE, BEHAVIORAL, AND COGNITIVE PROCESSES DATA COLLECTION

(71) Applicant: Educational Testing Service, Princeton, NJ (US)

(72) Inventors: Blair Lehman, Princeton, NJ (US); Thomas Florek, Lambertville, NJ (US); Debra Pisacreta, Lambertville, NJ (US); Enruo Guo, Lawrenceville, NJ (US); Srinivasa Pillarisetti, Robbinsville, NJ (US)

(73) Assignee: Educational Testing Service, Princeton, NJ (US)

( * ) Notice: Subject to any disclaimer, the term of this patent is extended or adjusted under 35 U.S.C. 154(b) by 949 days.

(21) Appl. No.: 16/380,680

(22) Filed: Apr. 10, 2019

Related U.S. Application Data

(60) Provisional application No. 62/655,865, filed on Apr. 11, 2018.

(51) Int. Cl.
*G09B 19/00* (2006.01)
*G09B 7/02* (2006.01)
*G09B 7/06* (2006.01)

(52) U.S. Cl.
CPC .............. *G09B 19/00* (2013.01); *G09B 7/02* (2013.01); *G09B 7/06* (2013.01)

(58) Field of Classification Search
CPC ............. G09B 19/00; G09B 7/02; G09B 7/06
USPC ........................................................ 434/238
See application file for complete search history.

(56) References Cited

PUBLICATIONS

Lehman, Blair A. and Sidney K. D'Mello. "All Alone with your Emotions : An Analysis of Student Emotions during Effortful Problem Solving Activities." (2008) (Year: 2008).*

(Continued)

*Primary Examiner* — Thomas J Hong
(74) *Attorney, Agent, or Firm* — Jones Day

(57) ABSTRACT

Systems and methods are provided for the design and implementation of experiments that facilitate the investigation of process data. The experiments involve recording the completion of a task by participants and then playing back the video of task completion to automatically probe participants about their affective, behavioral, and cognitive experiences. As a result of this system, information about affective, behavioral, and cognitive processes can be more easily investigated by researchers without computer programming knowledge. Corresponding apparatuses, systems, and methods are also discussed.

15 Claims, 18 Drawing Sheets

(56) References Cited

PUBLICATIONS

D'Mello, Sidney, Lehman, Blair, Person, Natalie; Monitoring Affect States During Effortful Problem Solving Activities; International Journal of Artificial Intelligence in Education, 20(4); pp. 361-389; 2010.

Graesser, Art, Witherspoon, Amy, McDaniel, Bethany, D'Mello, Sidney, Chipman, Patrick, Gholson, Barry; Detection of Emotions During Learning with AutoTutor; Proceedings of the 28th Annual Meeting of the Cognitive Science Society; pp. 285-290; 2006.

Lehman, Blair, Zapata-Rivera, Diego; Student Emotions in Conversation-Based Assessments; IEEE Transactions on Learning Technologies, 11(1); pp. 1-13; 2018.

Lehman, Blair, D'Mello, Sidney, Strain, Amber, Mills, Caitlin, Gross, Melissa, Dobbins, Allyson, Wallace, Patricia, Millis, Keith, Graesser, Art; Inducing and Tracking Confusion with Contradictions During Complex Learning; International Journal of Artificial Intelligence in Education, Special Issue: Best of AIED 2011, 22(2); pp. 71-93; 2013.

Rosenberg, Erika, Ekman, Paul; Coherence Between Expressive and Experiential Systems in Emotion; Cognition and Emotion, 8(3); pp. 201-229; 1994.

\* cited by examiner

FIG. 8

AFFECTIVE, BEHAVIORAL, AND COGNITIVE PROCESSES DATA COLLECTION

CROSS-REFERENCE TO RELATED APPLICATIONS

This application claims priority to U.S. Provisional Application No. 62/655,865, filed Apr. 11, 2018, the entirety of which is herein incorporated by reference.

TECHNICAL FIELD

The subject matter described herein relates to education, learning, and testing, and more specifically to effective generation of experimental tools for data collection of affective, behavioral, and cognitive processes in education and educational testing.

BACKGROUND

Educational researchers use a variety of tools to better understand the processes involved in effective human learning, acquisition of new knowledge, retention of knowledge, and performance during knowledge-based or skills-based testing. Some of these tools involve observing a person during performance of a task. A researcher may be interested in assessing and evaluating affective, behavioral, and cognitive processes during the performance of the task. As part of such evaluation, the person performing the task may be asked to self-evaluate their thoughts, mood, and attitudes during the performance of the task. However, such self-evaluation may distract them from performing the task, and the resulting evaluation may be skewed because of such interruptions. One of the ways to remove such artifacts from the research results is to avoid interruptions during the performance of the task, and instead playback the video taken during the performance of the task after the completion of the task. The person who performed the task can then be asked about their recollection of their affective, behavioral, and cognitive processes during the performance of the task.

A full experiment may therefore involve a human subject performing a task, video recording that performance, playing back the recording with added questions about human subject's recollection of their state of mind during performance of the task. Setting up such an experiment requires careful balancing of multiple objectives under various limitations. Currently known processes for experimental setup are labor intensive and require strong expertise both in cognition and in computer engineering. For these reasons, the existing processes are expensive, long, and difficult to replicate.

Therefore, there is a need in the technical field for systems and methods of fast, inexpensive, and repeatable experimental setup for data collection of affective, behavioral, and cognitive processes used in educational and cognition research.

SUMMARY

Processor implemented methods for evaluating a cognition-measuring effectiveness as a task are provided. Methods may include designing an experiment for a participant. The experiment may be configured to administer a task to the participant, administering the task to the participant, recording a video of the participant performing the task, playing back the video to the participant, collecting affective, behavioral, and cognitive data from the participant during a playback, and rendering data collected during the experiment for review.

Administering the task to the participant may include directing the participant to perform a pre-task activity, providing pre-task directions to the participant, directing the participant to perform a post-task activity, providing pre-playback directions to the participant, and providing end directions to the participant. Administering may also include recording in-task behaviors and verbalizations of the participant.

Processor implemented methods may include prompting the participant to make a judgment of difficulty of the task. Processor implemented methods may also include performing a think aloud protocol that asks the participant to verbalize their thought process while completing the task. Recording a video may include recording the participant's audio and task video.

Designing the experiment may include reviewing introductory information, making experiment design decisions, previewing the experiment, and publishing the experiment. Introductory information may include an overview of a type of experiment, a description of a task in the experiment, and available experiment design options.

Making experiment design decisions may include selecting channels to record during a performance of a task by the participant, selecting the task to record, selecting characteristics of a video playback, selecting stop points, creating stop point questions, linking questions to stop points, selecting video controls to make available during a playback, selecting playback data capture options, and selecting pre- and post-task activities.

Selecting channels to record during a performance of a task by a user may include selecting audio and video channels from a computer and audio and video channels from the participant. Selecting the task to record may include selecting either a desktop application or a web-based application. Selecting a video playback may include selecting either to save the video and not do a playback, or to playback the video.

Selecting stop points may include selecting manual stop points which provide information when the participant chooses to stop the playback, or selecting automatic stop points which provide information at pre-specified points and requiring the participant to provide information in order to resume the playback, or selecting both manual and automatic stop points.

The automatic stop points may include stop points occurring at a pre-defined time interval, stop points occurring at pre-defined time points, or stop points occurring at event-based locations. Creating stop point questions may include selection of a question type, the question type being a single-selection multiple-choice, multiple-selection multiple-choice, or open-ended.

Linking questions to stop points may include assigning the question to the stop point. Selecting video controls to make available during a playback may include selecting whether an observer is watching the playback with the participant. Selecting playback data capture options may include selecting to capture an identification of the participant, a stop point label, a stop point time, a stop point question, or a response of the participant.

Processor implemented methods may include comparing data collected during the playback with data collected from other participants, or calculating a scoring metric indicating an effectiveness of the experiment in assessing cognitive information from the participant.

Non-transitory computer program products (i.e. physically embodied computer program products) are also described that store instructions, which when executed by one or more data processors of one or more computing systems, cause at least one data processor to perform operations herein. Similarly, computer systems are also described that may include one or more data processors and memory coupled to the one or more data processors. The memory may temporarily or permanently store instructions that cause at least one processor to perform one or more of the operations described herein. In addition, methods can be implemented by one or more data processors either within a single computing system or distributed among two or more computing systems. Such computing systems can be connected and can exchange data and/or commands or other instructions or the like via one or more connections, including but not limited to a connection over a network (e.g., the Internet, a wireless wide area network, a local area network, a wide area network, a wired network, or the like), via a direct connection between one or more of the multiple computing systems, etc.

The subject matter described herein provides many technical advantages. For example, data from affective, behavioral, and cognitive processes can be collected quickly, effectively, and with repeatability. Further, the experimental setup may be done with a high degree of automation. This, in turn, may allow a broader range of researchers to design and perform cognitive experiments that utilize information about the process of task completion.

The details of one or more variations of the subject matter described herein are set forth in the accompanying drawings and the description below. Other features and advantages of the subject matter described herein will be apparent from the description and drawings, and from the claims.

DESCRIPTION OF DRAWINGS

FIG. 8 is a diagram illustrating creation of a stop point question according to another exemplary embodiment.

DETAILED DESCRIPTION

Systems and methods described herein may facilitate collection of affective, behavioral, and cognitive processes data when users interact with a task. Specifically, systems and methods described herein may provide researchers with the ability to set up an automated system for experiment delivery, capture audio and/or video data of users (e.g., participants) interacting with a task (e.g., computer-based assessment or learning activity), and collect process data from users as they watch a video playback of their interaction with the task. Systems and methods described herein may also provide a user-friendly interface for researchers to set up their experiment. The interface of some embodiments may allow researchers without programming knowledge or skills to design and create a data collection that would otherwise require computer-programming expertise. In addition, some embodiments may provide researchers with information pertaining to advantages and disadvantages for different selection options in the data collection process. Thus, researchers may be scaffolded through the process of designing their experiment. Next, we first discuss the type of experiment that can be created, followed by a discussion of how systems and methods described herein enable researchers to design such an experiment.

Figure 1:
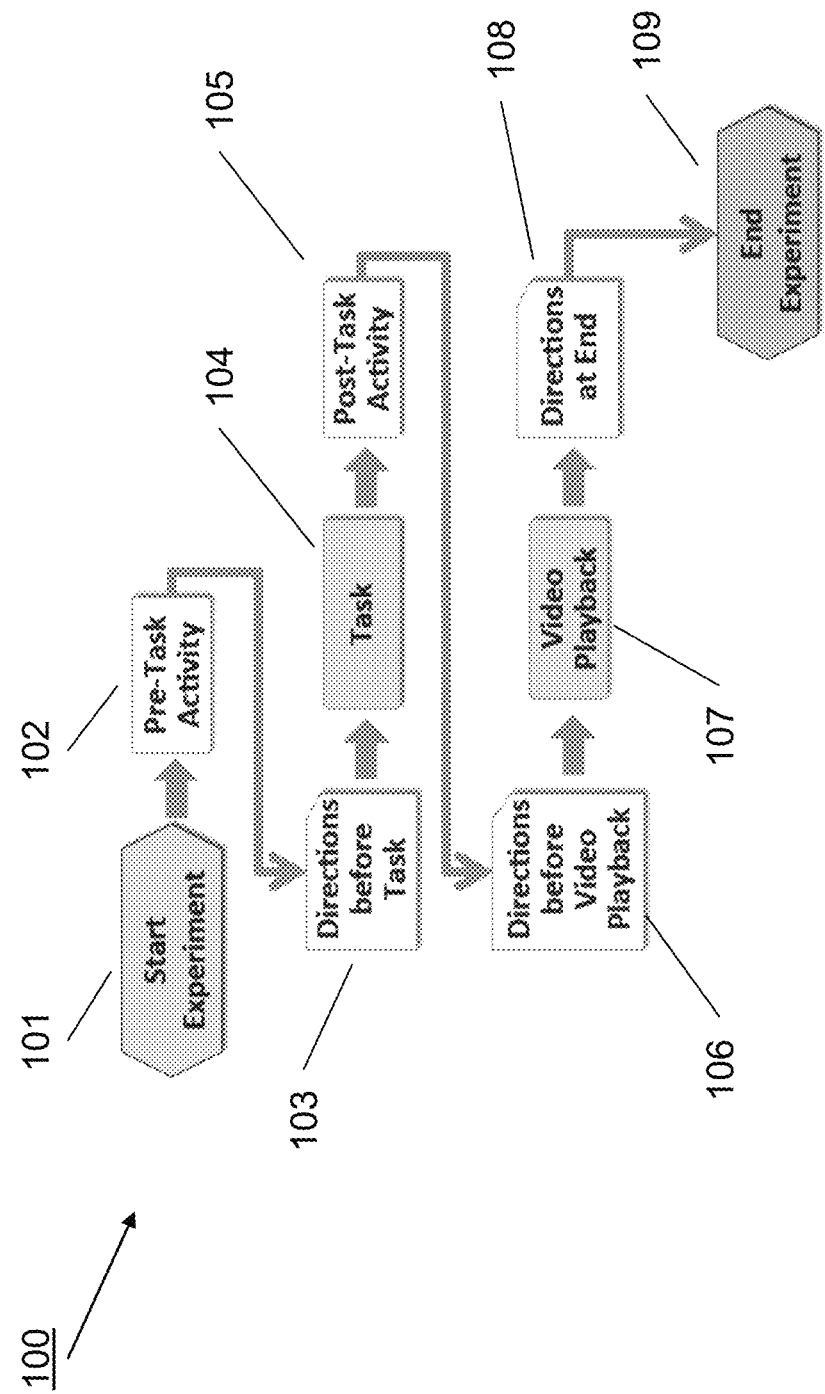
FIG. 1 is a flow diagram illustrating steps of activities according to one exemplary embodiment.

FIG. 1 is a flow diagram illustrating steps of activities according to one exemplary embodiment. For experiment delivery, system 100 may link together a variety of activities for participants to complete. This linking of activities may involve automatically presenting each activity and/or coordinating the transition between activities. The automatic presentation and transition between activities may allow researchers to collect data from more than one participant simultaneously and/or without monitoring by researchers. FIG. 1 shows the flow of activities that can occur in an experiment according to an embodiment. It is important to note that the activities depicted in FIG. 1 are all optional, with the exception of the "Task" 104. This means that researchers may have flexibility with respect to what occurs in their experiment. FIG. 1 is the flow of activities from the perspective of the person participating in the experiment. We will discuss the flow of events for designing an experiment by the researcher after further description of the activities in FIG. 1.

After an experiment start 101, certain pre-task activity 102 may be conducted. Pre-task activity 102 may include any one or more of the following: survey, presentation of information, task that will not be recorded, and another activity that the researcher would like to have participants complete.

After pre-task activity 102, directions before task 103 may be set up. Directions before task 103 may include an opportunity to provide instructions to participants before they begin the task.

After directions before task 103, task 104 may be set up. Task 104 may include target activity that participants may complete during the experiment. Task 104 may be web-based or a desktop application that can range from an interactive virtual world to a slide show, in terms of complexity. Task 104 is the only activity in the experiment that may be recorded and the only required activity for all experiments created with system 100.

After task 104, post-task activity 105 may be set up. Post-task activity 105 may include any one or more of the following: survey, presentation of information, task that will not be recorded, and another activity that the researcher would like to have participants complete. Post-task activity 105 may occur at the same time that the task video is being processed.

After post-task activity 105, directions before video playback 106 may be set up. Directions before video playback 106 may include an opportunity to provide instructions to participants before they begin the video playback.

After directions before video playback 106, video playback 107 may be set up. Video playback 107 may include participants watching a playback of the video of themselves completing the task. The video can include up to four channels that include audio and video from the participant and from the computer (i.e., task). The video may also include more than four channels. The playback 107 may stop at pre-specified points in the video and may pose pre-specified questions to participants. The pre-specified stop points and questions may be defined by the researcher during the experiment design.

After video playback 107, directions at end 108 may be set up. Directions at end 108 may include an opportunity to provide instructions to participants at the completion of the experiment. After directions at end 108, there may be an end of experiment 109.

The general data collection design provided by systems and methods of some embodiments may allow for the further investigation of participants' experience with the task without interrupting the typical way in which participants would interact with the task. Prompting participants to make judgments of difficulty, for example, during the task may alter the way in which they experience the task. The video playback in systems and methods of some embodiments may allow for this kind of prompting with the full context of the interaction provided by the video. Retrospective judgments of this kind can allow for more frequent prompting than would be possible for prompts during the task. However, the retrospective judgments of systems and methods of some embodiments can also be combined with in-task judgments or verbalizations. A think aloud protocol that asks participants to verbalize their thought process while completing a task, for example, can be combined with a video playback by recording participants' audio and task video (as well as other channels, if needed). The video playback can then be utilized for further reflection or for researchers to pose follow-up questions based on participants' verbalizations during the task. Next, we describe how researchers design and create their experiment using systems and methods of some embodiments.

Figure 2:
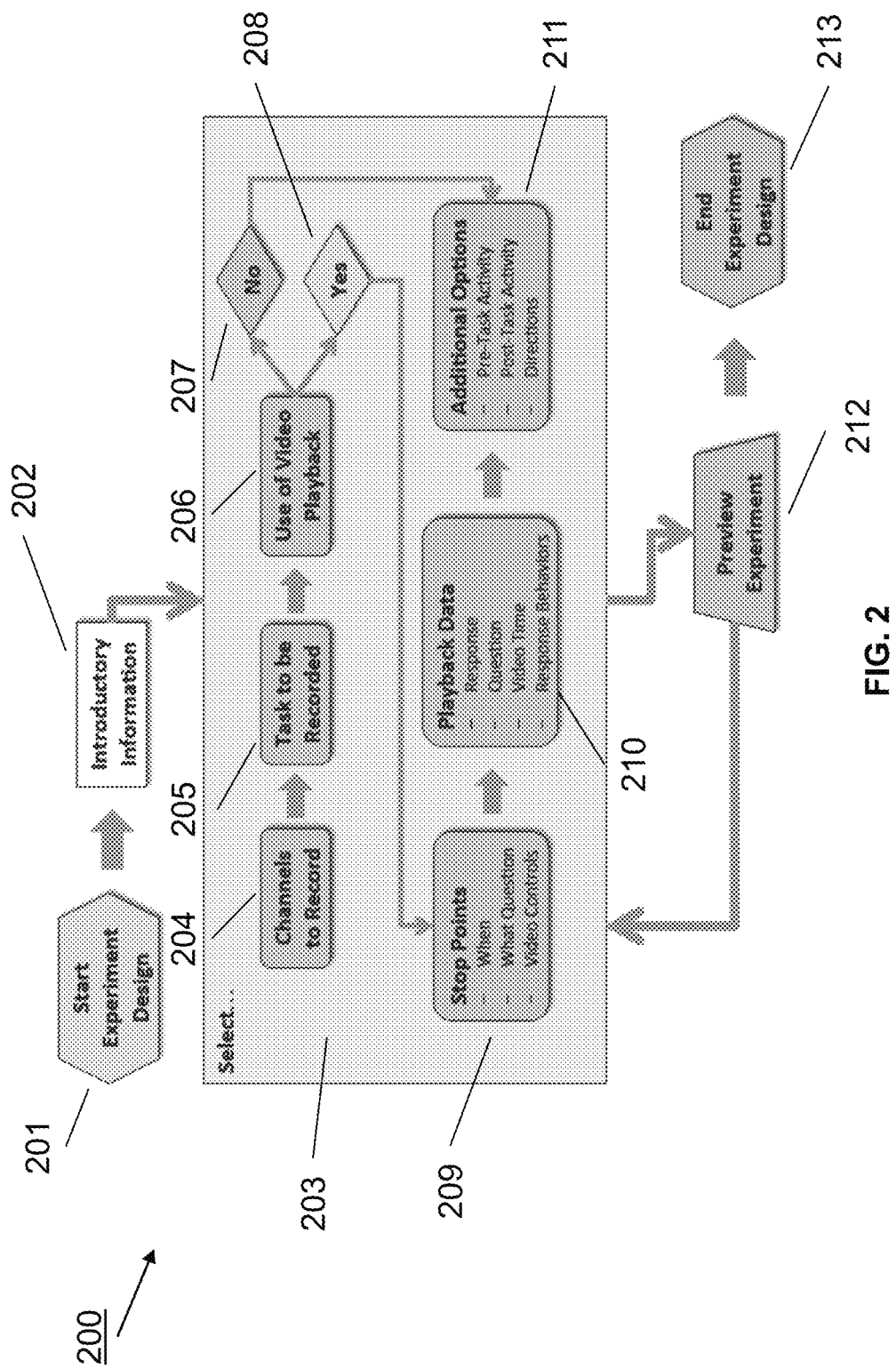
FIG. 2 is a flow diagram illustrating steps of experimental design according to another exemplary embodiment.

FIG. 2 is a flow diagram illustrating steps of experimental design 200 according to another exemplary embodiment. Systems and methods of some embodiments may have a user-friendly interface that may walk researchers through the process of designing and creating their experiment, without the need of computer-programming skills. FIG. 2 shows the general flow of events that may occur when researchers design their experiments. Experiment design in some embodiments may begin, after the experiment design start 201, with introductory information 202 that may provide an overview of the type of experiment that can be designed with systems and methods of some embodiments as well as descriptions of each major activity in the experiment and/or the options available to researchers. Next, researchers may begin designing their experiment by making selections 203.

Exemplary design decisions will be described further below, along with screenshots of the interface according to some embodiments. In some embodiments, selections may include one or more of the following: channels to record 204, a task to be recorded 205, use of video playback 206 (yes path 209B or no path 207), stop points 209, playback data 210, and additional options 211.

Lastly, researchers may be able to preview the experiment they have designed at 212. At this point in the process researchers can either publish their project, which would create the software for experiment delivery and end the experiment design 213, or they can return to the experiment design process and make any revisions needed. Next, we describe some experiment design decisions available to researchers as shown in FIG. 2.

Figure 3:
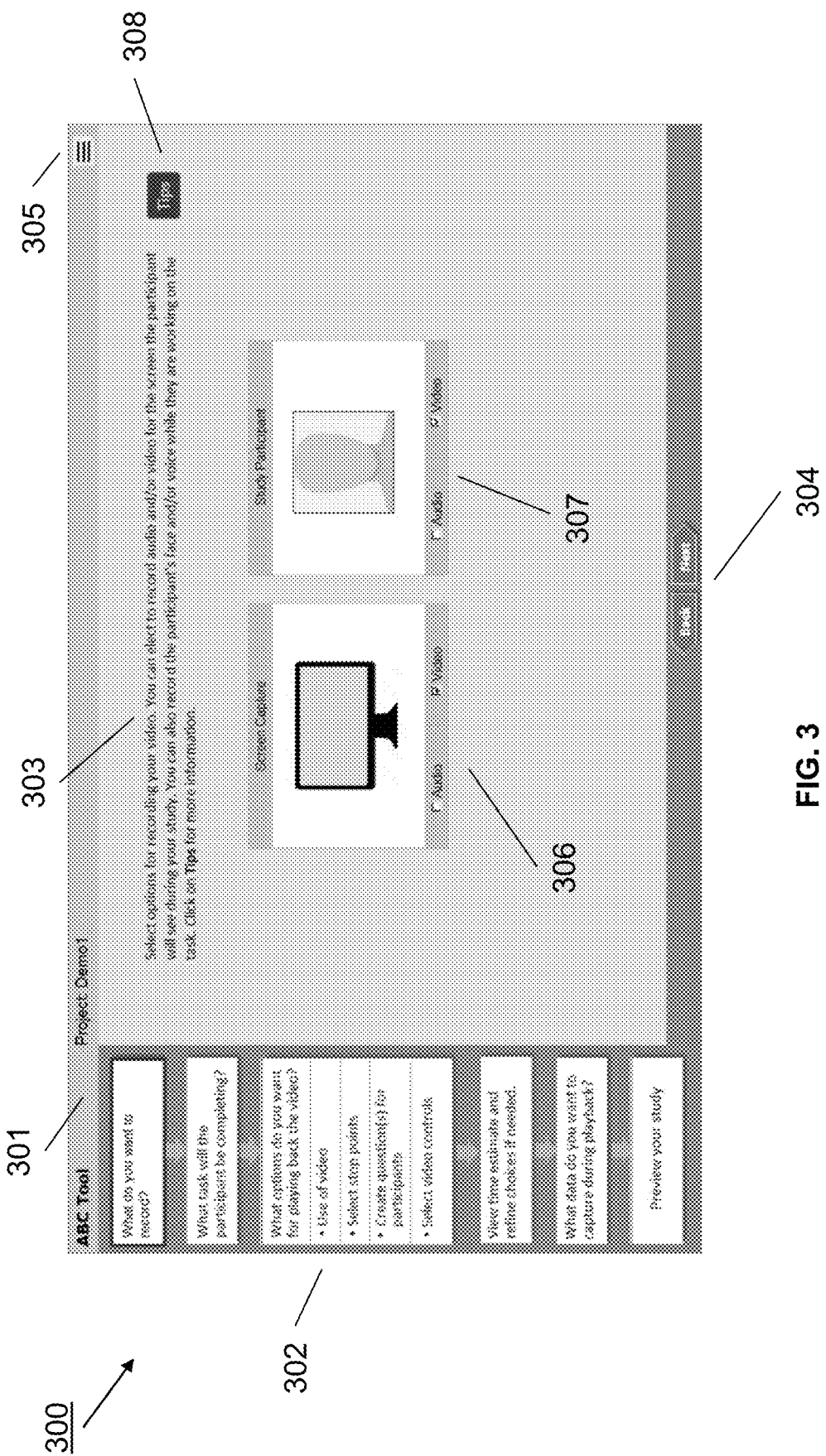
FIG. 3 is a diagram illustrating selection of channels to record according to another exemplary embodiment.

FIG. 3 is a diagram illustrating selection of channels to record according to another exemplary embodiment. Selection of channels may be facilitated by an interactive display 300, which may include a top menu 301, a side bar menu 302, an instructions field 303, a navigation menu 304, and a general menu 305. The top menu 301 may include a name of a system and a name of a current project. The side bar menu 302 may include quick access blocks that may enable navigation to one of the other steps of the experiment design. The instructions field 303 may display instructions to a researcher for setting up this portion of the experiment. The navigation menu 304 may provide buttons for moving to a previous step of the experiment setup and/or to a subsequent step of the experiment setup. The general menu 305 may be a drop down menu of commands and/or navigational options, which may assist the researcher in developing the experiment setup.

The first design decision that researchers may make is what channel(s) to record when participants complete the task. In an embodiment, there are four available channels that can be selected. These channels may include a selection panel 306 for selecting audio and video channels from the computer and a selection panel 307 for selecting audio and video channels from the participant. Researchers can select any combination of channels that are pertinent for their experiment.

In some embodiments, additional information may be recorded and may be available for playback. Such additional information may include one or more of the following: additional audio data; additional video data; eye tracking; physiological sensors; pressure sensor from chairs.

Interactive display 300 may also provide tips button 308 that may facilitate the decision making process for researchers. The selected channels may be recorded during task completion and then may be combined into one video file. Tips button 308 may provide user with one or more of the following reminders.

Researcher may select the recording options that are most important for their study. The recording options that are most appropriate may depend on one or more of the following: the task being recording; the type of data to collect; the total time for data collection session. For example, if the task to be recorded does not include any sound, then the audio option for screen capture may not need to be selected.

When considering the type of data to collect, it may not be necessary to include all available recording options. For example, for a think aloud protocol, only the audio option for study participant may be needed if the facial expressions, movements, and gestures of the participant are not relevant to the goals of the study. However, if those behaviors are important to the goals of the study and a think aloud protocol is included, then both the audio and video options for study participant may be included.

The total session time may be considered, because the number of selected options, particularly the number of video options, may increase the video processing time. On the view time estimate and refine choices if needed step, it may be possible to see how the selected options impact the video processing time and contribute to the overall study session time. It may be important to carefully consider the nature of the task and the goals of the study when selecting the recording options.

Figure 4:
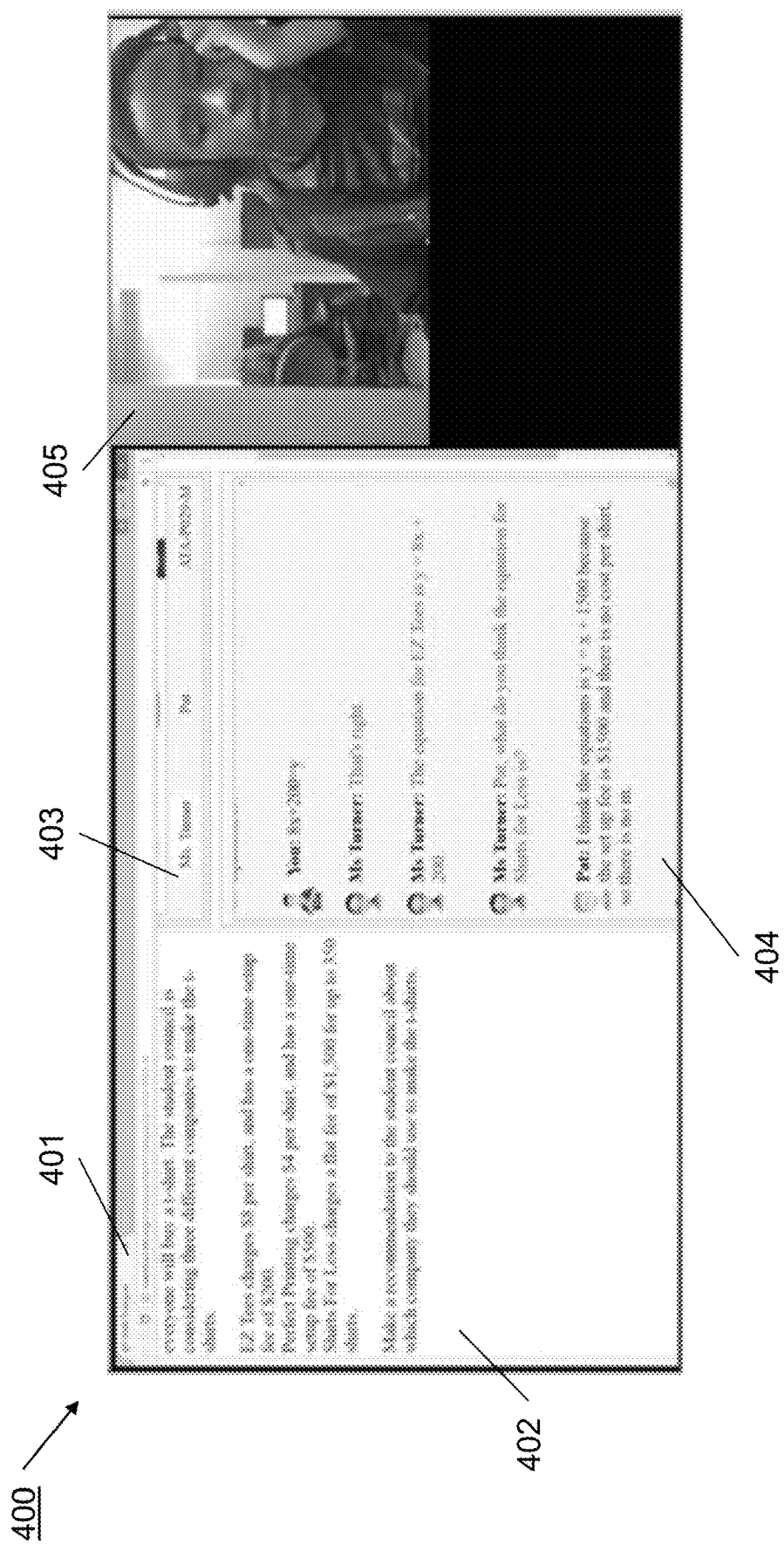
FIG. 4 is a diagram illustrating combining participant video and computer video channels according to another exemplary embodiment.

FIG. 4 is a diagram illustrating combining participant video and computer video channels according to another exemplary embodiment. Screen 400 shows a combination of video channels from the participant and the computer screen during an experiment that was designed with the system according to an embodiment. Screen 400 may include a top menu 401, a task display 402, an experiment layout 403, an experiment transcript 404, and a participant video 405. Elements 402, 403, and 404 may all be part of the task that was completed by the participant in one web browser window.

Figure 5:
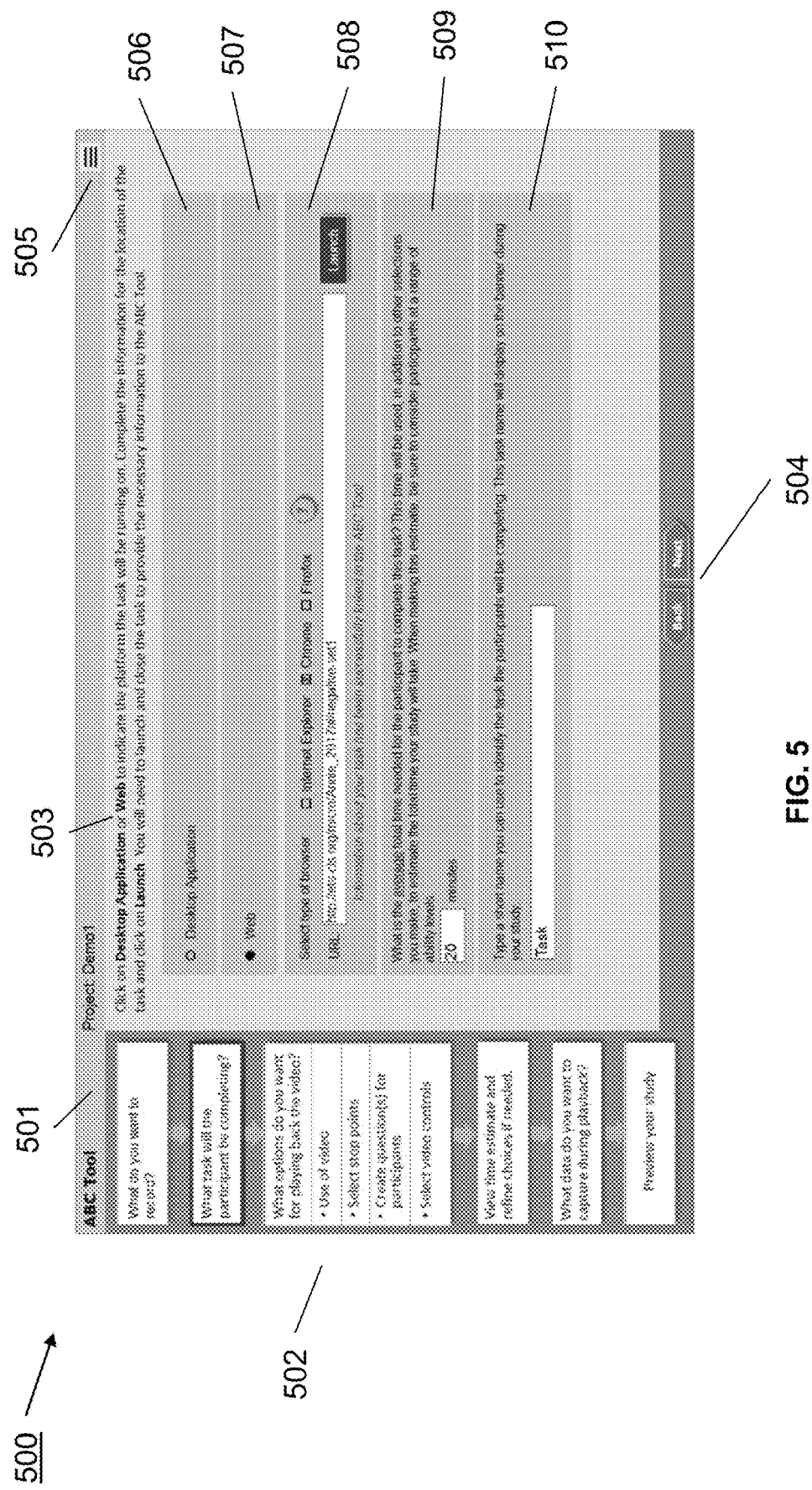
FIG. 5 is a diagram illustrating selection of a task to record according to another exemplary embodiment.

FIG. 5 is a diagram illustrating selection of a task to record according to another exemplary embodiment. Selection of task to record may be facilitated by an interactive display 500, which may include a top menu 501, a side bar menu 502, an instructions field 503, a navigation menu 504, and a general menu 505. The next design decision that researchers must make may be what task to record when completed by participants. Researchers may have the option to select either a desktop application 506 or a web-based application 507. A desktop application 506 can vary in complexity from the presentation of a virtual world to a slide show of static images, and anything in between. For web-based applications 507, researchers can select the type of browser 508 to be used for the task. For both types of tasks, researchers may also be asked to provide an estimate 509 of the average time to complete the task and to provide a short name 510 for the task. The task time estimate 509 may be used later for estimating the total experiment time.

Figure 6:
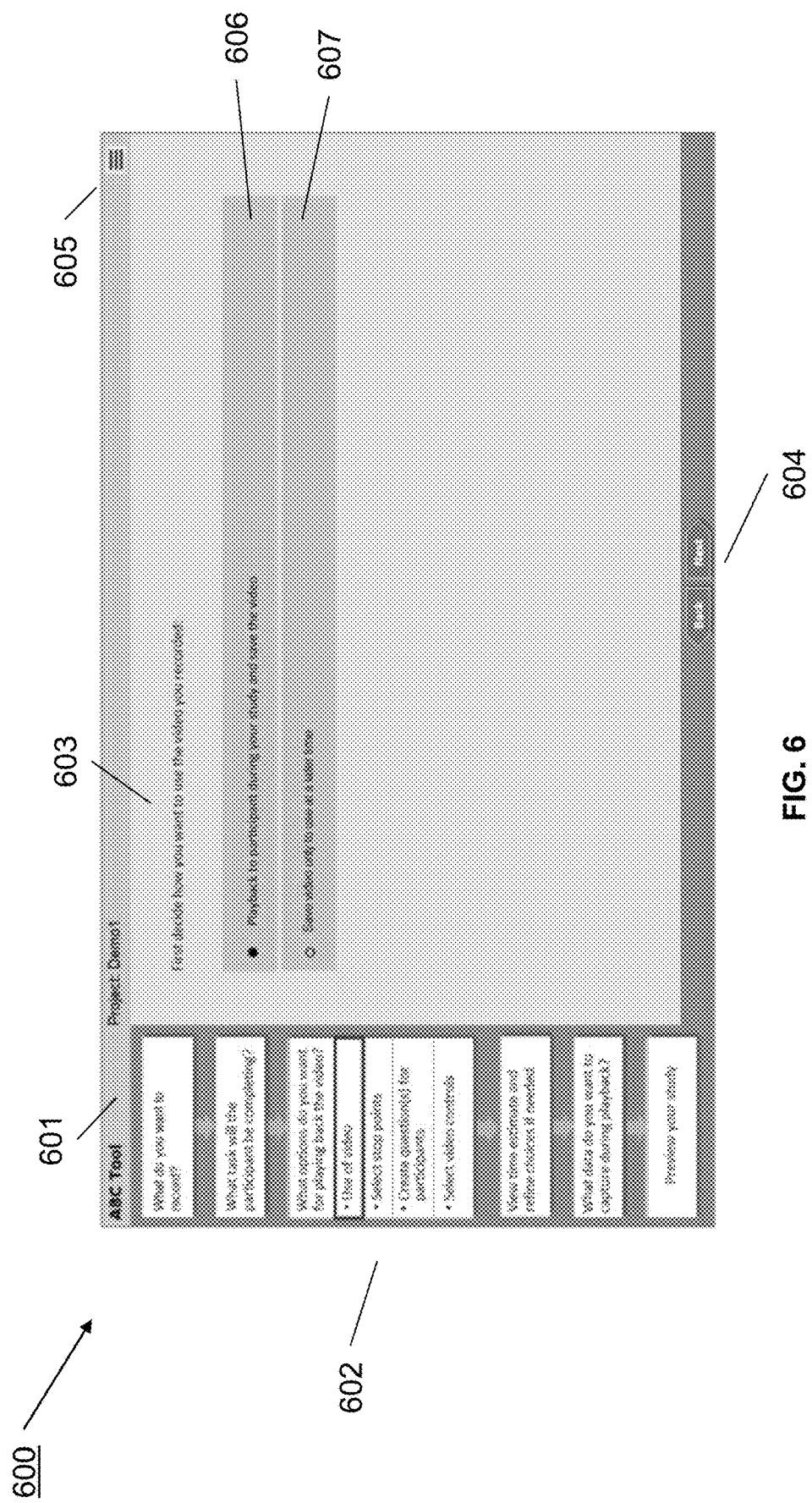
FIG. 6 is a diagram illustrating selection of a video playback according to another exemplary embodiment.

FIG. 6 is a diagram illustrating selection of a video playback according to another exemplary embodiment. Selection of a video playback may be facilitated by an interactive display 600, which may include a top menu 601, a side bar menu 602, an instructions field 603, a navigation menu 604, and a general menu 605. The next design decision that researchers may make is whether they will have participants complete the video playback during the experiment, 606. If researchers choose to save the video and not do a playback during the experiment, 607, they may jump to the selection of additional options, otherwise they may continue to make design decisions for the video playback as shown in FIG. 2.

Figure 7:
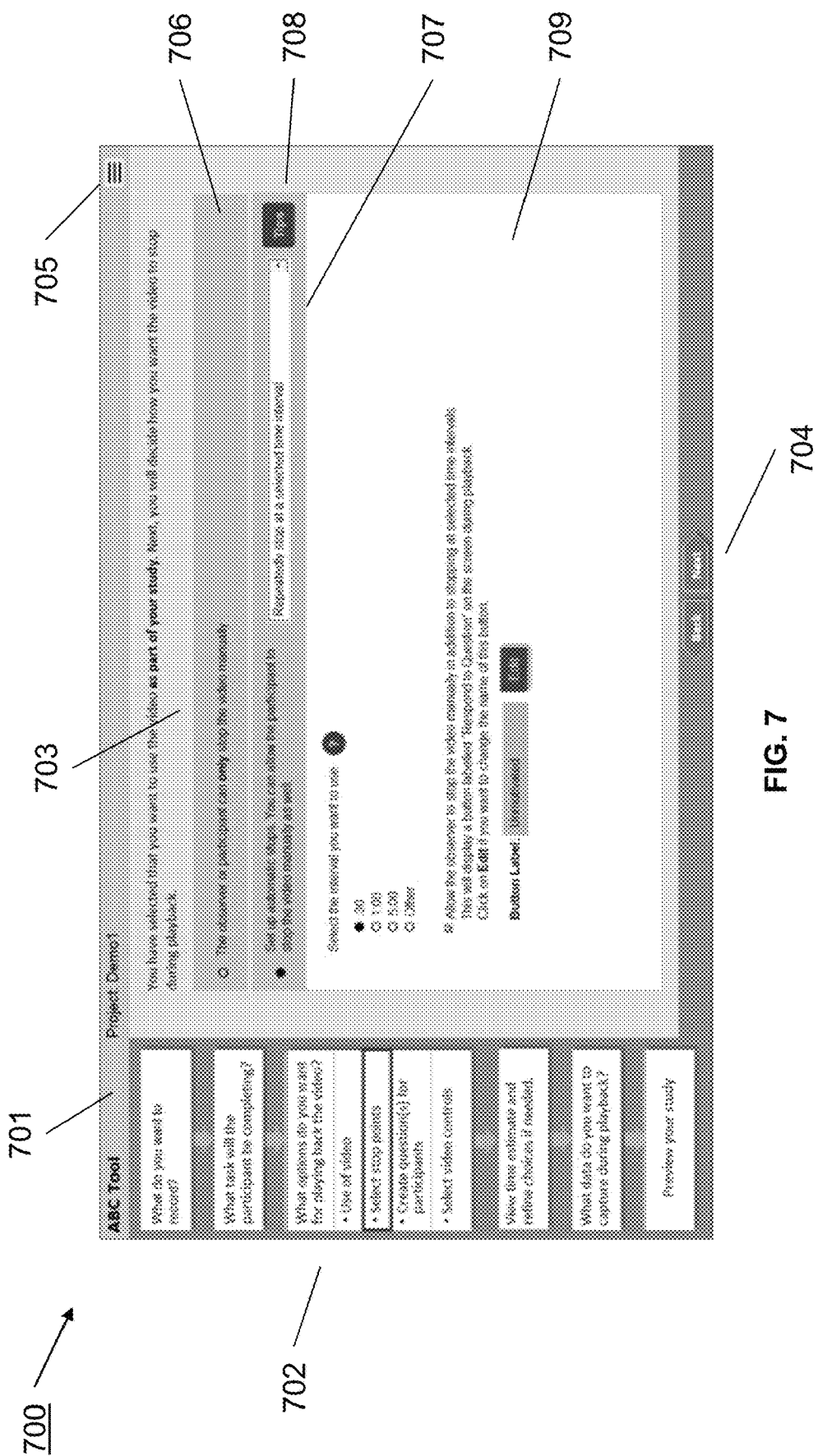
FIG. 7 is a diagram illustrating selection of stop points according to another exemplary embodiment.

FIG. 7 is a diagram illustrating selection of stop points according to another exemplary embodiment. Selection of stop points may be facilitated by an interactive display 700, which may include a top menu 701, a side bar menu 702, an instructions field 703, a navigation menu 704, and a general menu 705. If researchers have selected to include a video playback in their experiment (choice 606 in FIG. 6), then the next design decisions may involve selecting how that video playback will occur. Specifically, researchers may decide when the stop points (i.e., collect process information from participants) will occur, what question(s) will be posed, how those questions will be linked to stop points, and what video controls will be available to participants.

Researchers may have three options for when stop points will occur during the video playback. Stop points can occur only manually 706, only automatically 707, or both manual and automatically 709. Manual stop points may involve participants only providing information when they choose to stop the video. Automatic stop points, on the other hand, may be pre-specified by the researchers and may cause the video to automatically stop and require participants to provide information in order to proceed. FIG. 7 shows a screen 700 of one type of automatic stop point selected as well as enabling the use of manual stop points. When manual stop points are present, researchers can select the label for the button (e.g., Unmotivated in section 709 of FIG. 7) that participants may click to provide information.

There are three types of automatic stop points that researchers can choose from to include in the video playback. The first stop point type is shown in FIG. 7 and these may occur at a regular time interval. These time interval stop points may occur at any interval pre-defined by researchers (e.g., every 30 seconds, every 1 minute, etc.). The second stop point type may also be time-based, but these may occur at pre-defined time points specified by researchers. A particular task may have important events that occur at 2 minutes, 5 minutes, and 10 minutes, for example. In this case the researcher can set these time-based locations to be stop points. The third stop point type may be event-based locations. Event-based locations may be derived from task log files, which may enable researchers to have a stop point at the same event for each participant, even if the event occurs at different times for each participant. For example, researchers may want to gather additional process information for every participant when they complete question two in the task. In some embodiments, only one of these automatic stop point types can be selected for any video playback.

The screen 700 may provide tips 708 about when and why certain automatic stop points may be more or less advantageous. Tips button 708 may provide user with one or more of the following reminders.

Three types of automatic stop points may be described. Each of these automatic stop points can be combined with manual stop points. Repeated stop at a selected time interval may mean that during playback the video will automatically stop and present one question to the participant at the designated time interval. The same question may be presented at each automatic stop point. The time interval could be every 30 seconds, every minute, every 5 minutes, or any time of researcher's choosing.

Stop at specific locations in the video may mean that during playback the video may automatically stop and present one question to the participant at the designated time-based locations in the video. For example, researcher can have the video stop at 1:00 (one minute) and 2:45 into the video for all participants and present a question. At each time-based location researcher can present a different question to participants. Researcher may be limited to a maximum number of time-based locations (e.g., 5, 10, 20, or other number of locations); however, there may be no restrictions on the locations of time-based locations.

Stop at specific events in the video may mean that during playback the video may automatically stop and present one question to the participant at the designated event in the video. The events may come from the log file generated by the task. For example, researcher can have the video automatically stop when every participant is asked Question 2, regardless of when Question 2 occurs for each participant. At each event researcher can present a different question to participants. Each event can occur once, multiple times, or not at all depending on the log file for a particular participant. Researcher may be limited to a maximum number of events (e.g., 5, 10, 20, or other number of events).

When determining what type of automatic stop point to use, it may be important to consider (a) the total task time, (b) how many questions researcher wants to pose to participants, and (c) the total study session time. Consideration of these three elements of the study may allow the researcher to determine how often it may be appropriate to present a question, what type(s) of questions may be appropriate to present, and if the researcher will be able to collect all of the necessary information during the total study session time.

Figure 8:
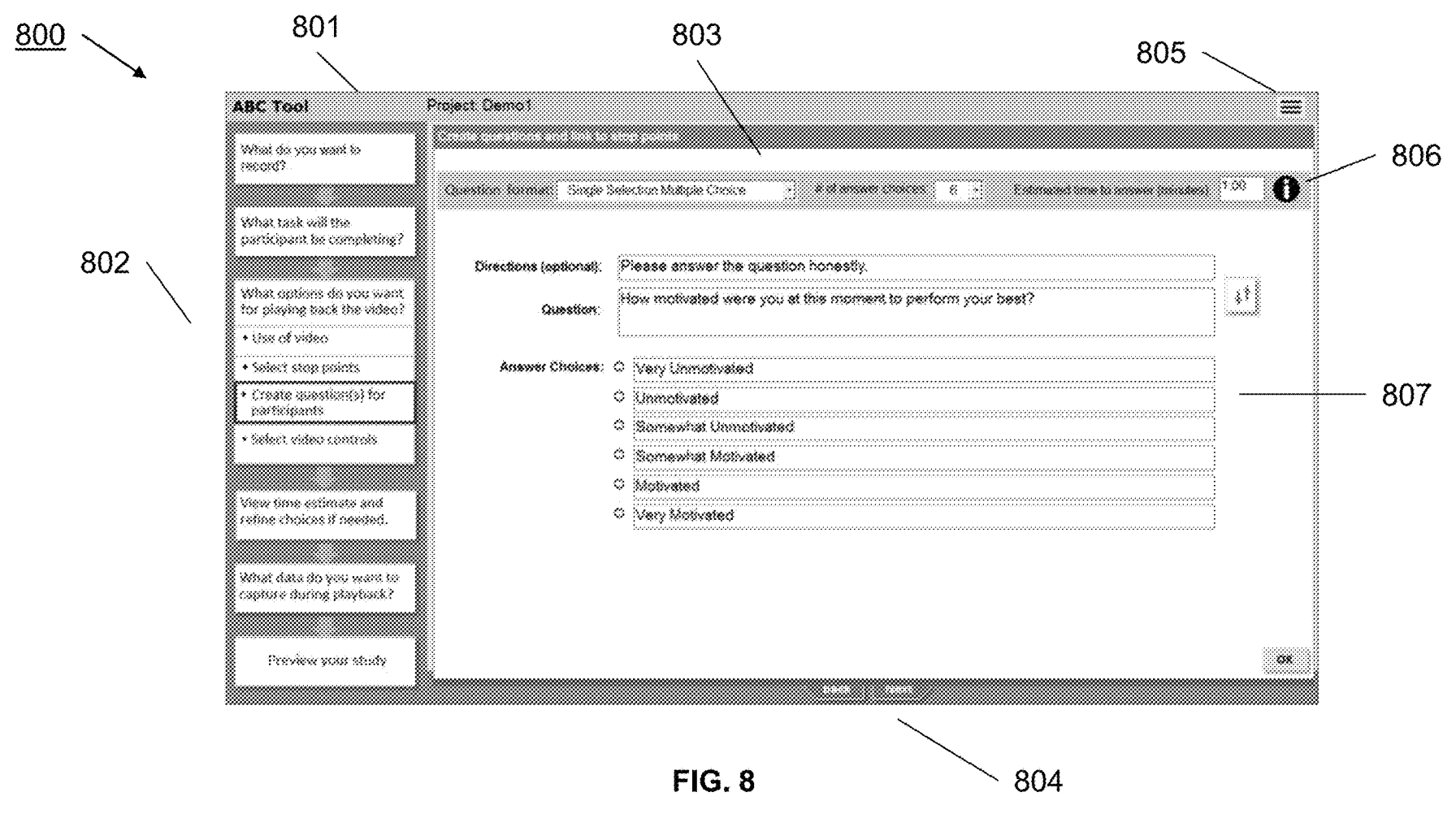

FIG. 8 is a diagram illustrating creation of a stop point question according to another exemplary embodiment. Creation of a stop point question may be facilitated by an interactive display 800, which may include a top menu 801, a side bar menu 802, an instructions field 803, a navigation menu 804, and a general menu 805. A question may be posed to participants at each stop point during the video playback in order to gather process information. Researchers can choose between three types of questions, selected at a choice entry area 806. One question type may be single-selection multiple-choice in which the participant can only select one option when responding (see FIG. 8). Researchers enter the text for their question and can include directions for the question and as many answer choice options as needed, in question entry area 807. The second question type may be multiple-selection multiple-choice, which may be the same as the single-selection multiple-choice except that participants can select more than one option when responding. The third question type may be open-ended in which participants may provide a text-based response to the question. Researchers may also be asked to estimate the amount of time needed to answer the question in order to facilitate estimating the total experiment time.

Figure 9:
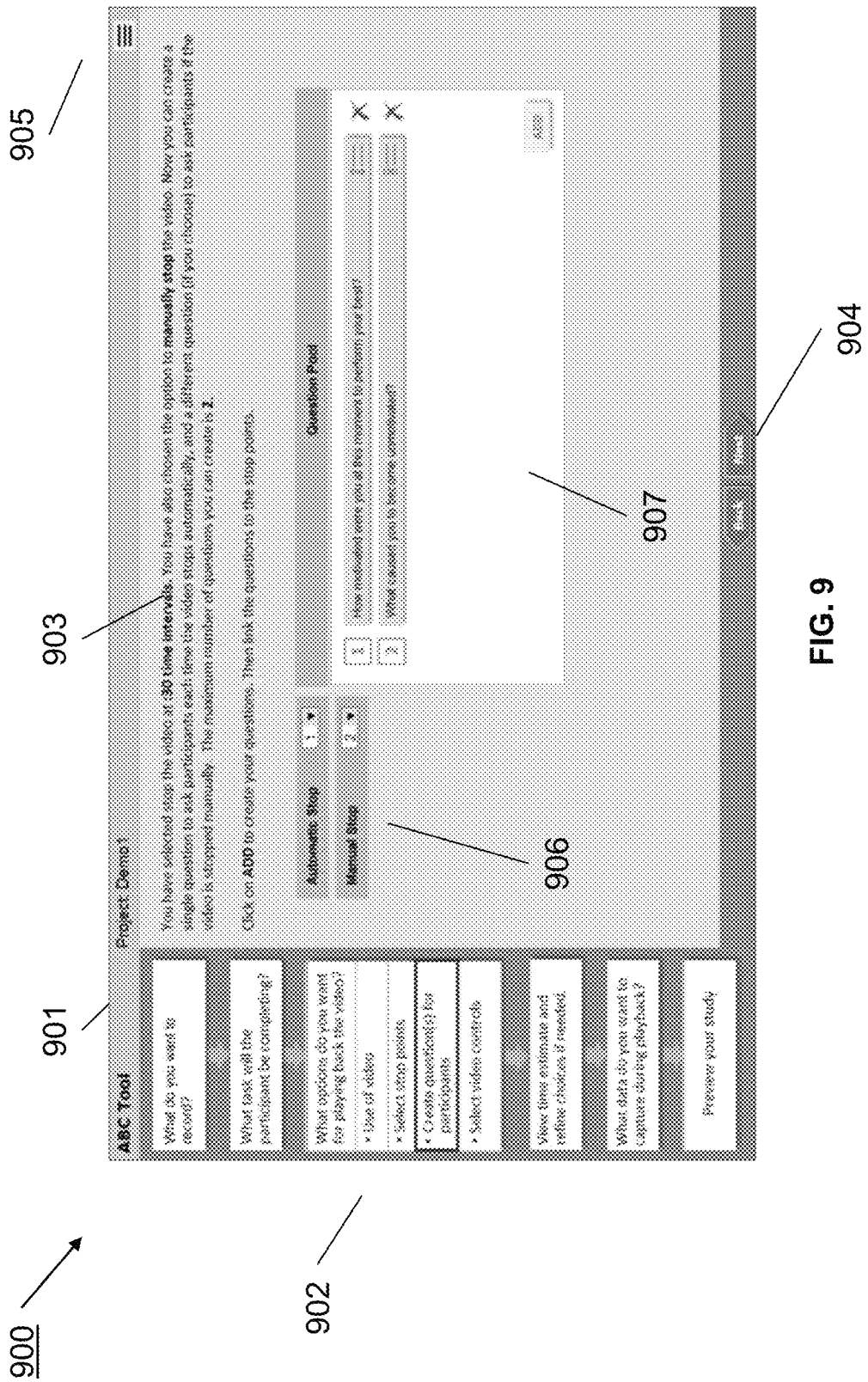
FIG. 9 is a diagram illustrating linking questions to stop points according to another exemplary embodiment.

FIG. 9 is a diagram illustrating linking questions to stop points according to another exemplary embodiment. Linking questions to stop points may be facilitated by an interactive display 900, which may include a top menu 901, a side bar menu 902, an instructions field 903, a navigation menu 904, and a general menu 905. After researchers have decided when stop points will occur and the question(s) that will be posed during the playback, they may decide how the question(s) may be linked to the stop points. In other words, researchers may decide what question may be shown when a particular stop point occurs. The linking of questions and stop points may vary based on the previous options selected by researchers for when stop points will occur. FIG. 9 shows the linking process when time interval automatic stop points and manual stop points have been selected (see FIG. 8). In this embodiment, researchers can only pose two different questions to participants during the playback, one question when the automatic stop point occurs and another question when the manual stop point occurs (see stop options area 906 in FIG. 9). In the case of time-based and event-based locations, researchers can link a different question to each event, although a number of questions researchers may present at any given stop point may be restricted to one, two, four, or another number of questions. Text of questions may be edited by selecting the question from the question entry area 907.

Figure 10:
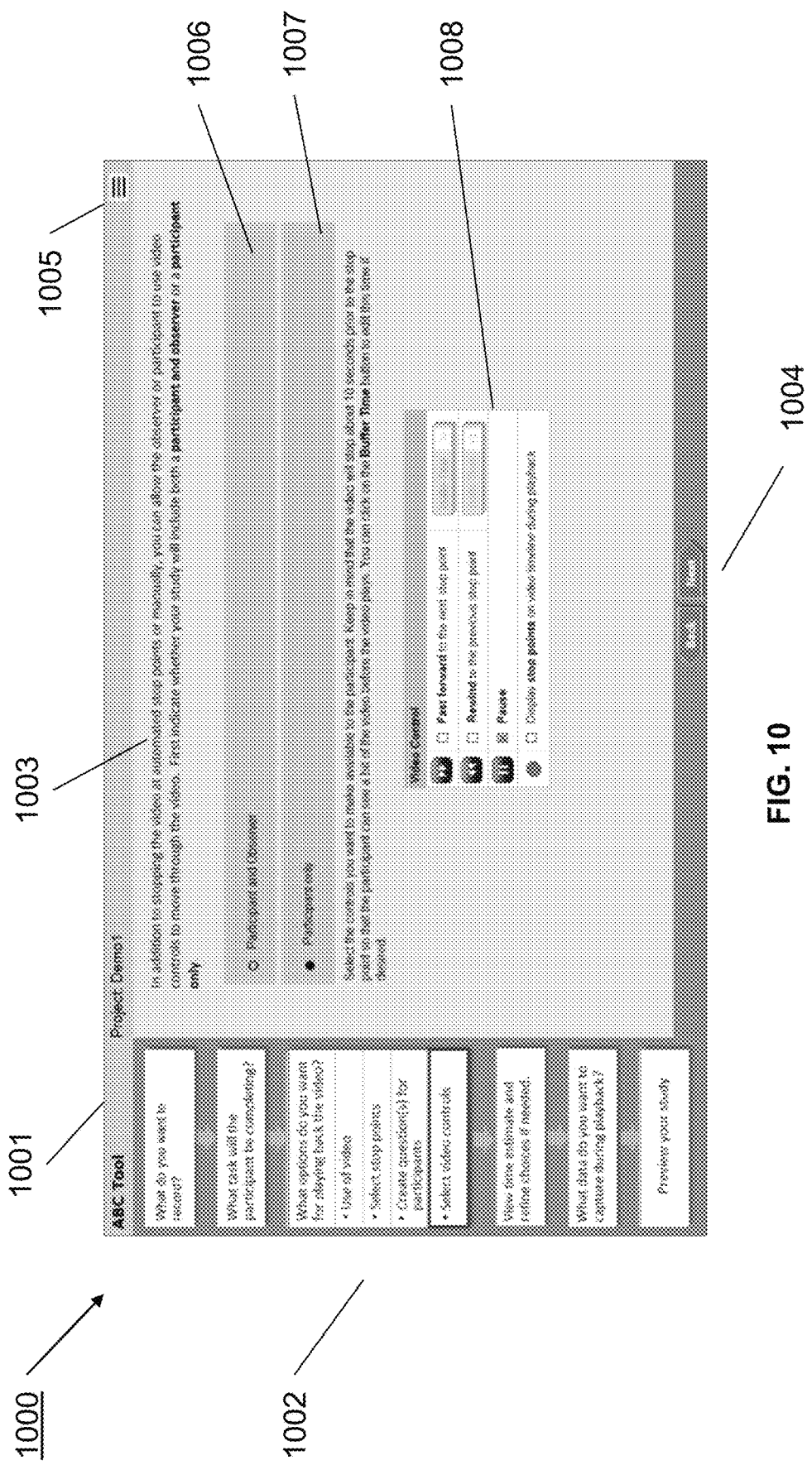
FIG. 10 is a diagram illustrating selection of video controls to make available during video playback according to another exemplary embodiment.

FIG. 10 is a diagram illustrating selection of video controls to make available according to another exemplary embodiment. Selection of video controls may be facilitated by an interactive display 1000, which may include a top menu 1001, a side bar menu 1002, an instructions field 1003, a navigation menu 1004, and a general menu 1005. The next video playback decision that researchers may make is what types of video controls to make available during the playback. There may be two general options shown in FIG. 10 that may differ on who is present during the video playback. If an observer or researcher is with the participant while watching the video playback (option 1006), more video control options can be enabled. However, if only the participant is watching the video playback (option 1007), then there may be a more restricted set of video control options. Specifically, researchers can choose to allow participants to fast forward and rewind based on the locations of stop points (i.e., participants cannot fast forward past an automatic stop point) and pause the video while watching, in video control selector 1008. Researchers can also select to display the stop points on the video timeline, which may allow participants to know when a stop point will occur before the video stops.

Figure 11:
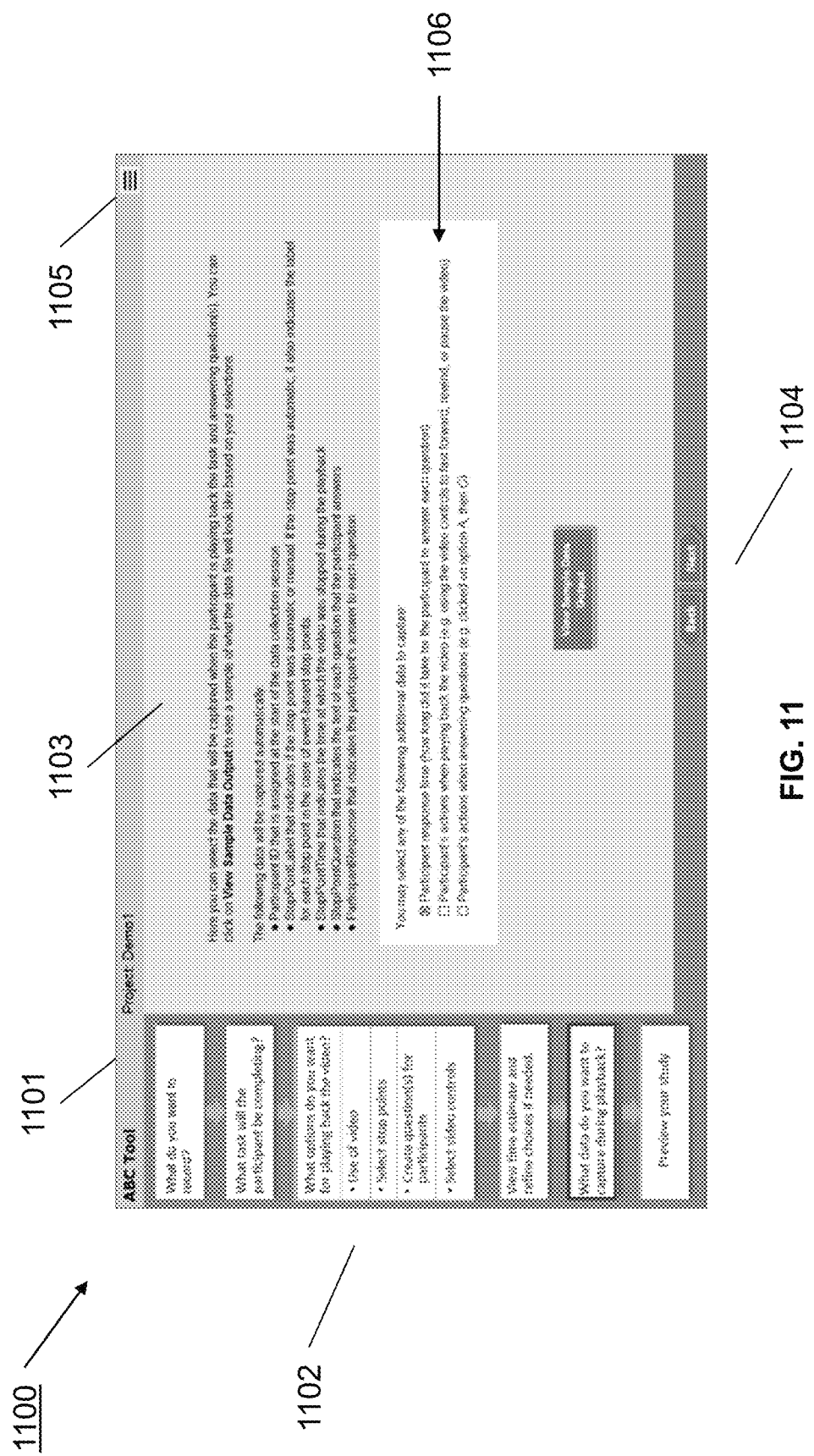
FIG. 11 is a diagram illustrating selection of playback data capture options according to another exemplary embodiment.

FIG. 11 is a diagram illustrating selection of playback data capture options according to another exemplary embodiment. Selection of playback data capture options may be facilitated by an interactive display 1100, which may include a top menu 1101, a side bar menu 1102, an instructions field 1103, a navigation menu 1104, and a general menu 1105. If researchers have selected to do a video playback during their experiment, the next decision they may make is what data may be captured during the video playback. FIG. 11 shows the different data capture options available to researchers. There may be five pieces of data that can be automatically captured at each stop point: participant identification (e.g., Participant4), stop point label (e.g., manual, automatic), stop point time (i.e., time point in the video), stop point question, and participant response. There may be three additional pieces of data that can be captured as well if selected in playback data capture selector 1106. The first option may be the participant response time, which may capture how long the participant takes to respond to the stop point question. The second option may be participant actions, which may capture when participants use any of the video control options that are available during the video playback. The third option may be participant response actions that occur when the participant is responding to the stop point question (e.g., select option A and then switch to option C). Researchers can also view sample data outputs of the different pieces of data in order to better understand how the data output will be formatted.

Figure 12:
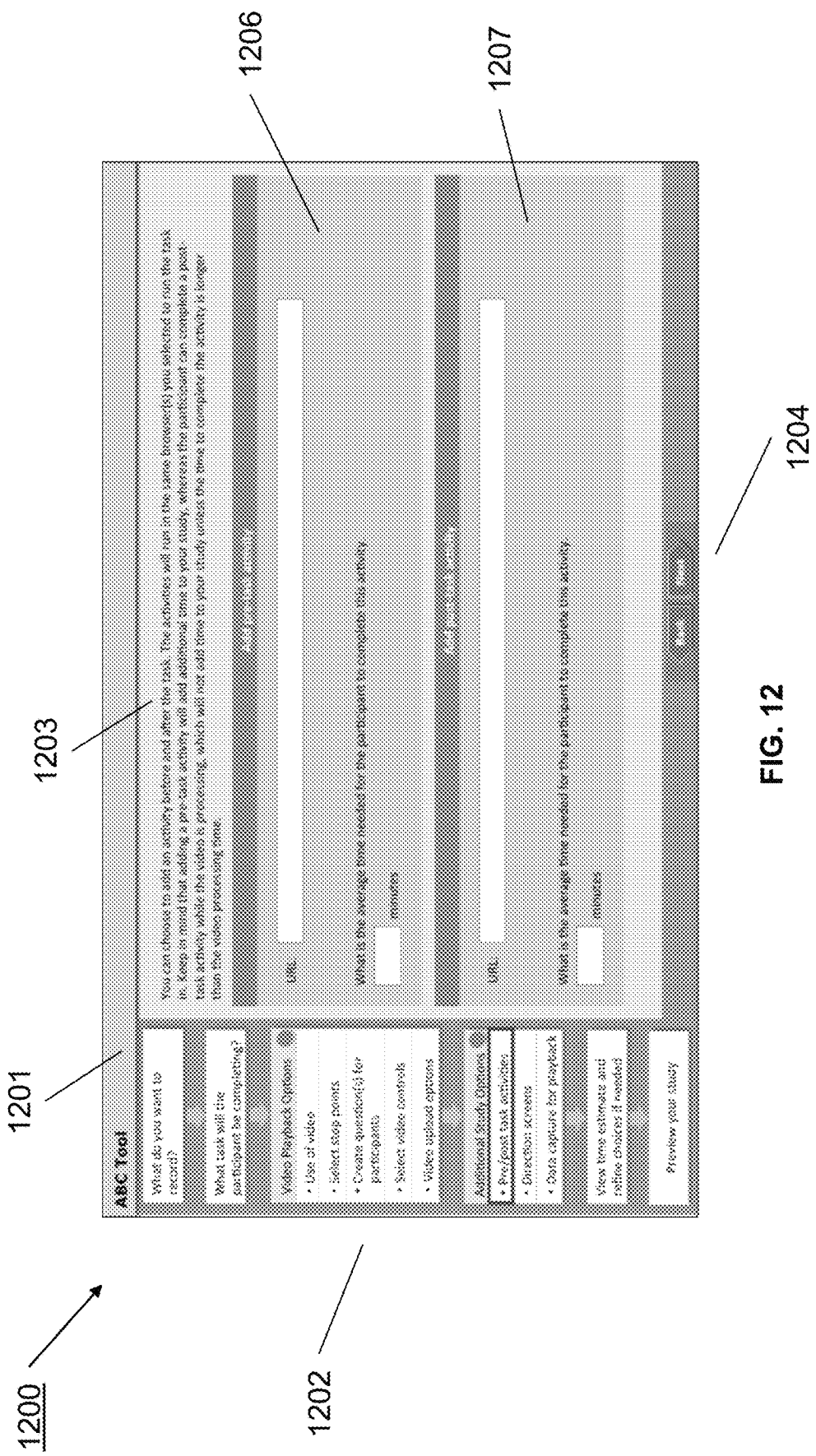
FIG. 12 is a diagram illustrating selection of pre and post-task activities according to another exemplary embodiment.

FIG. 12 is a diagram illustrating selection of pre and post-task activities according to another exemplary embodiment. Selection of pre and post-task activities may be facilitated by an interactive display 1200, which may include a top menu 1201, a side bar menu 1202, an instructions field 1203, and a navigation menu 1204. The last design decisions that researchers may make relate to optional activities to occur during the experiment. Specifically, these may be pre- and post-task activities and direction screens (see FIG. 2). Researchers can utilize some, all, or none of these optional activities. FIG. 12 shows how researchers may setup pre-task activities (entry field 1206) and post-task activities (entry field 1206) that may be web-based, which may include providing the URL and a time estimate for activity completion. Templates for direction screens may be provided to suggest important information to relay to participants. However, researchers can replace the template information with their own as well.

Figure 13:
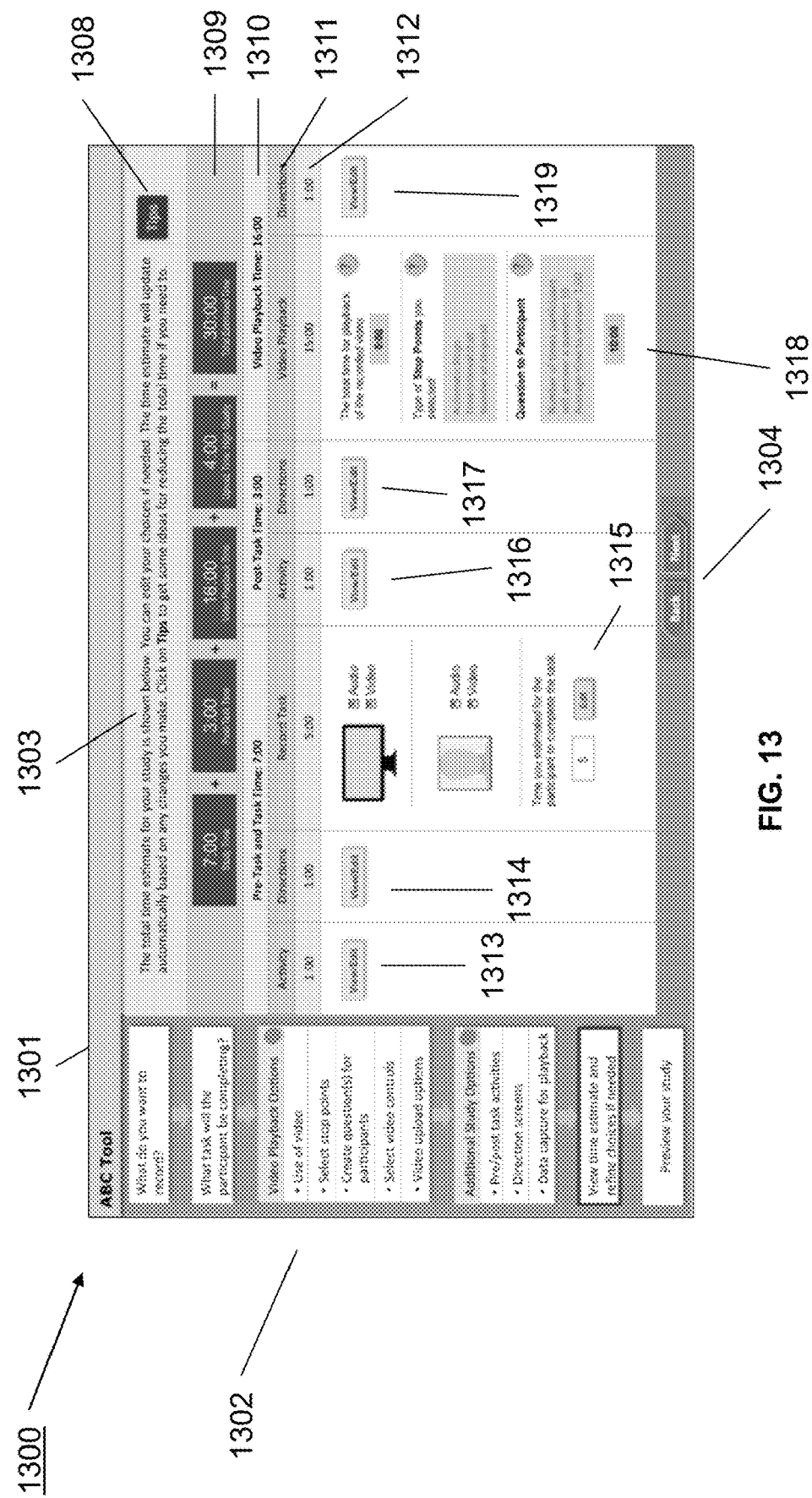
FIG. 13 is a diagram illustrating estimation of experiment timing according to another exemplary embodiment.
Figure 14:
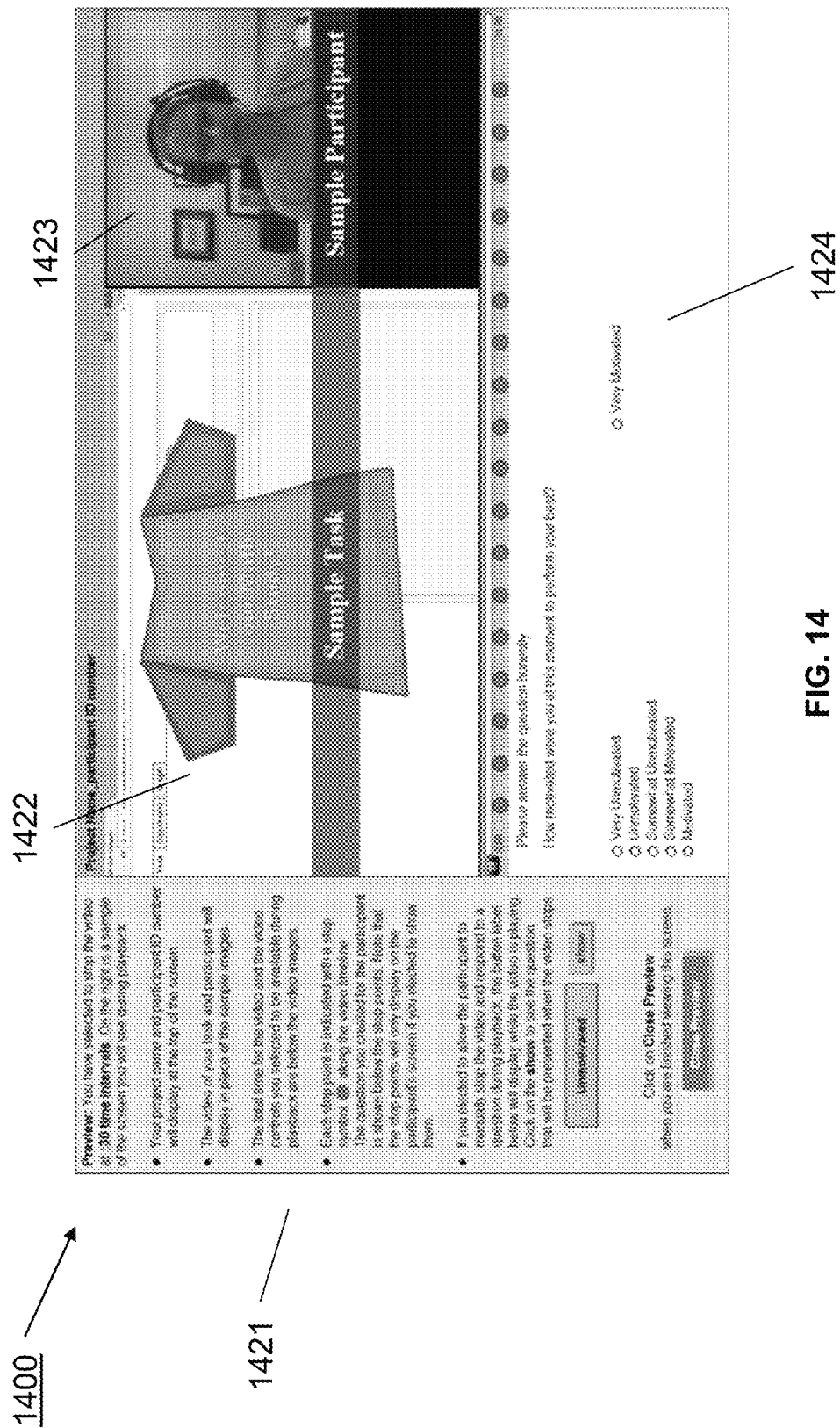
FIG. 14 is a diagram illustrating a video playback preview according to another exemplary embodiment.

After researchers have made all of the experiment design decisions in the previous steps, they may get two previews of their experiment. This information can then be used to make any necessary changes or proceed to finishing the experiment for experiment delivery. One preview may be an estimated experiment timing as shown in FIG. 13. Another preview may be a visual presentation of the video playback as shown in FIG. 14.

FIG. 13 is a diagram illustrating estimation of experiment timing according to another exemplary embodiment. Estimation of experiment timing may be facilitated by an interactive display 1300, which may include a top menu 1301, a side bar menu 1302, an instructions field 1303, and a navigation menu 1304. At multiple points throughout the experiment design, researchers may be asked to provide time estimates for the different activities that participants may complete. Estimates may be provided for high-level activities 1310, or for sub-activities 1311. In an embodiment, the following time estimates 1312 may be provided: pre-task and task time, including activity 1313, directions 1314, and record task 1315; post-task time, including activity 1316 and directions 1317; video playback time, including video playback 1318 and directions 1319. The information provided by researchers may then be used to calculate an estimate for the total time 1309 needed for one participant to complete the experiment. FIG. 13 shows how the total time estimate is computed as well as the design decisions that have been made by the researcher. Researchers can also edit any previous design decisions and those design changes may be used to automatically update the total time estimate.

Researchers may be provided with tips 1308 about how they can reduce the total time estimate if it goes beyond their time constraints for an experiment session. Tips 1308 may include one or more of the following. The time estimate for the processing section may only be modified by changes to the time estimated to complete the task that is recorded. The estimated processing time may not be updated based on changes to the recording options (e.g., removing video option for study participant). Time estimates for processing may vary based on the computer being used to complete the data collection. The current time estimate provided for processing may likely be at the higher end for the potential total processing time. It is important to test out researcher's project on the computer that will be used for the data collection in order to get a more accurate estimate of the processing time.

If the time estimate for the total time is too long, researcher may consider modifying one or more of the following: the number of stops during playback; the type of question(s) researcher is asking; the length of the pre-task or post-task activity. Researcher may allow for a range of completion times to insure that all participants can complete the study.

FIG. 14 is a diagram illustrating a video playback preview according to another exemplary embodiment. In an embodiment, the preview of the video playback may involve a visual presentation of the experiment design decisions that have been made by the researcher. FIG. 14 shows the preview screen 1421 for the video playback. In an experimental design of this embodiment, the researcher has selected to record video of both the task (1422) and the participant (1423), include time interval automatic and manual stop points, allow participants to pause the video, and display the automatic stop point locations on the video timeline. In addition, the question that is linked to the automatic stop point, with directions, may be shown (1424), as it would be to participants. Researchers can then close the preview and make any necessary changes to the design decisions.

Figure 15:
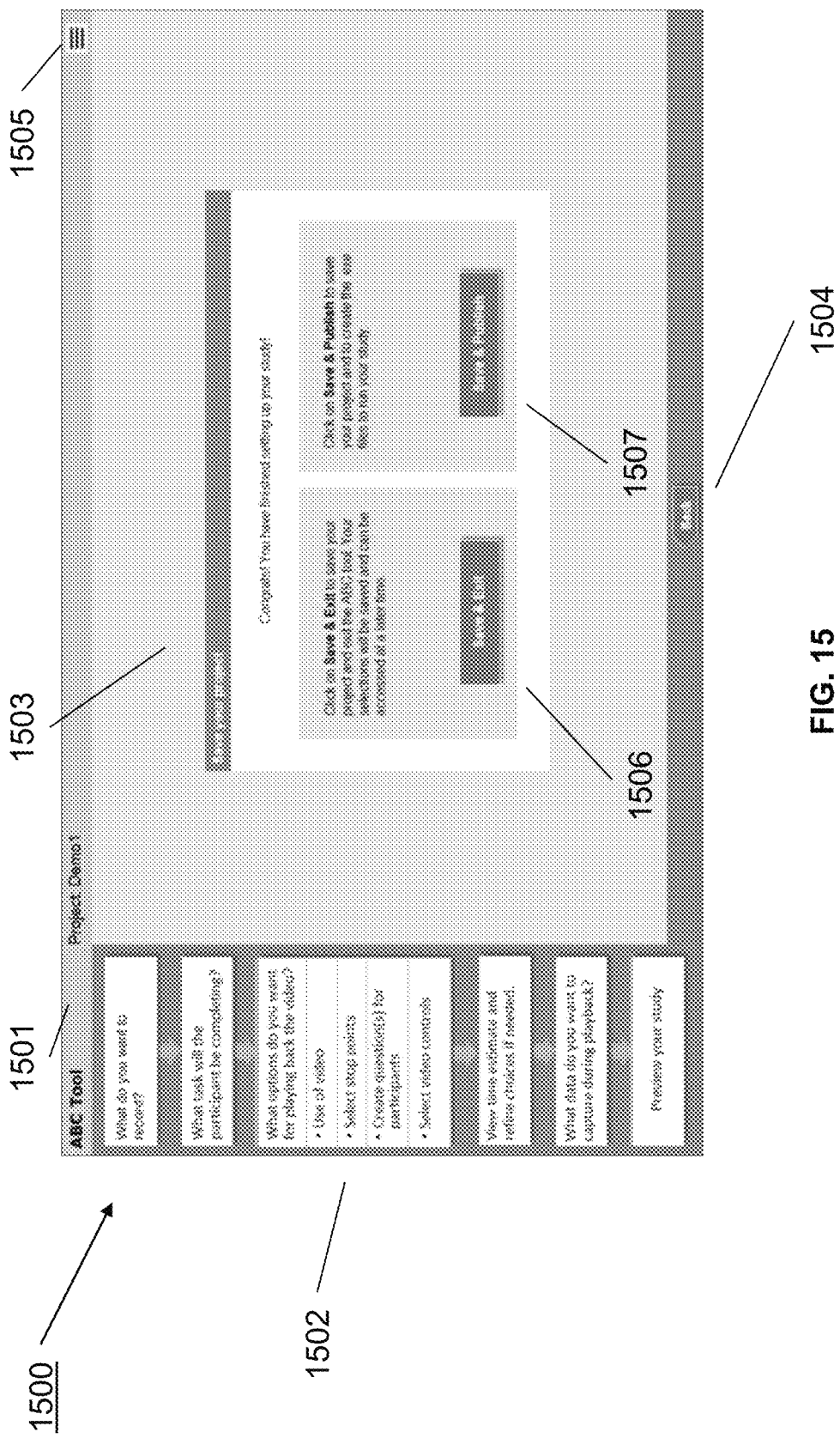
FIG. 15 is a diagram illustrating experiment design end screen according to another exemplary embodiment.

FIG. 15 is a diagram illustrating experiment design end screen according to another exemplary embodiment. Experiment design end screen 1500 may include a top menu 1501, a side bar menu 1502, an instructions field 1503, a navigation menu 1504, and a general menu 1505. After researchers have viewed the two experiment previews and have finalized their design decisions, they can either save the experiment (1506) or save and publish the experiment (1507). FIG. 15 shows a screenshot of these two options. If researchers select to save and publish the experiment (1507), they may be provided with information about the next steps for conducting their experiment. The next steps may include information about the structure of the software for experiment delivery as well as tips about testing the software prior to the actual data collection. After publishing their experiment, researchers may only need to return to the experimental setup if they need to make experiment design changes or to create a new experiment.

Once the experiment is designed, researcher may proceed with conducting the experiment. This may include administering a task to a participant. It may include video playback to the participant. It may include collecting affective, behavioral, and cognitive data either during the performance of the task, or during the video playback, or both. In some embodiments, data collected during the performance of the task or the playback may be compared with data collected from other participants.

In some embodiments, a scoring metric is calculated. Scoring metric may be calculated after the performance of the task or after the video playback. In some embodiments, the scoring metric may indicate an effectiveness of the experiment in assessing cognitive information from the participant.

Figure 16A:
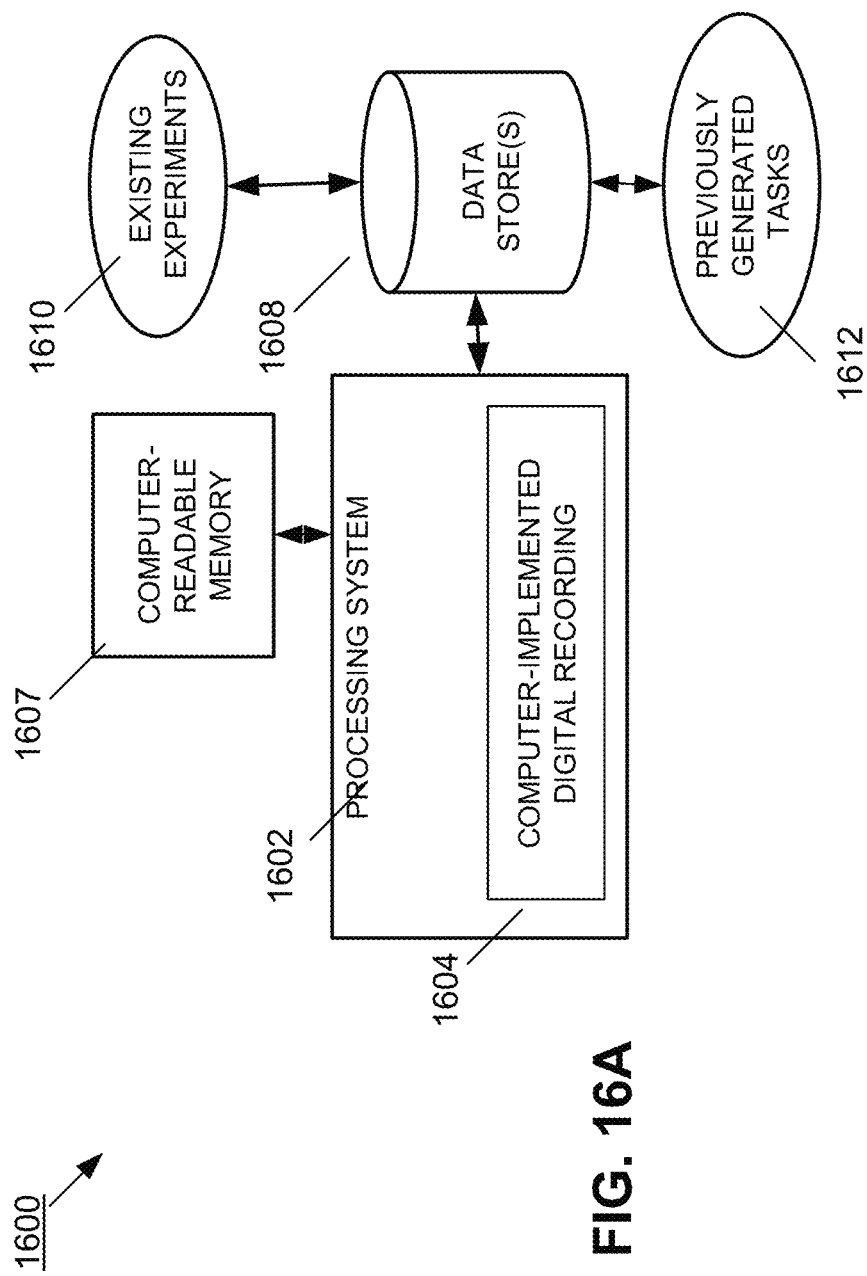
FIGS. 16A, 16B, and 16C depict example systems for implementing the approaches described herein for affective, behavioral, and cognitive processes data collection.
Figure 16B:
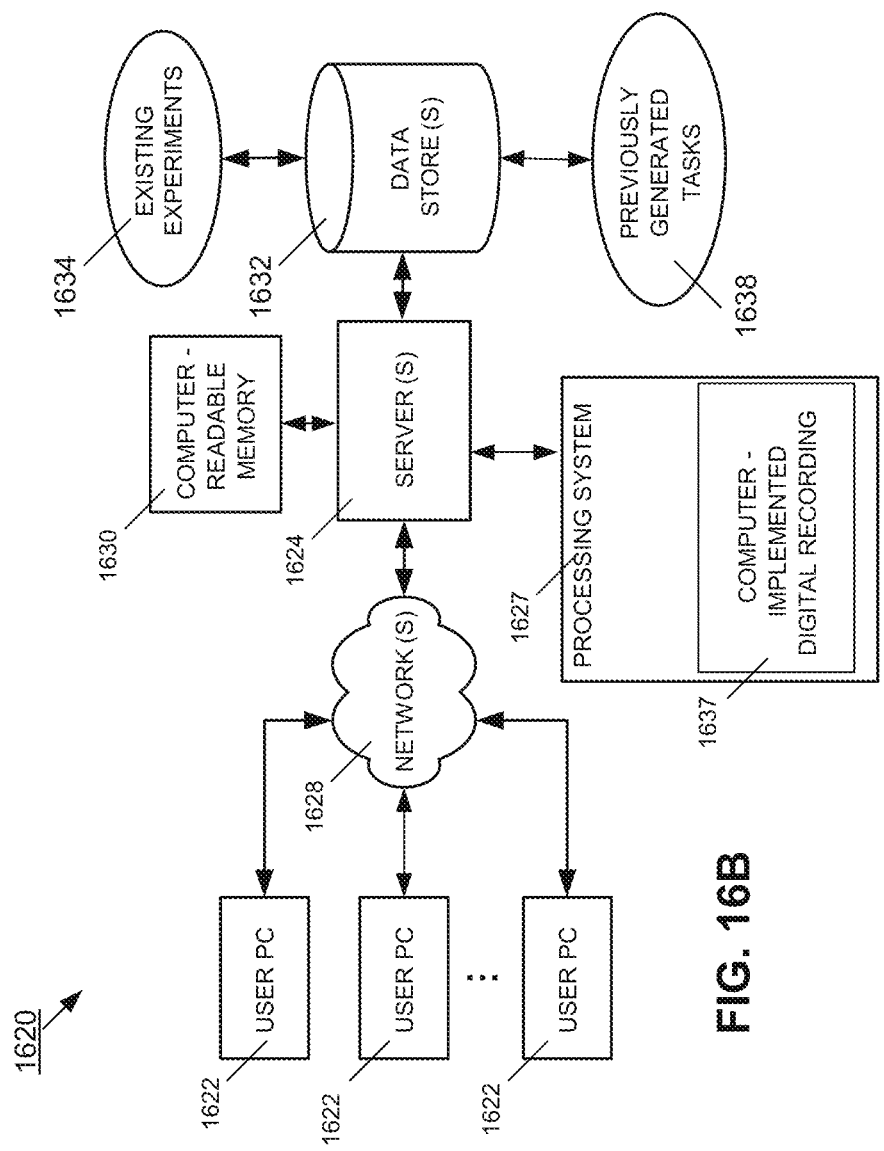
Figure 16C:
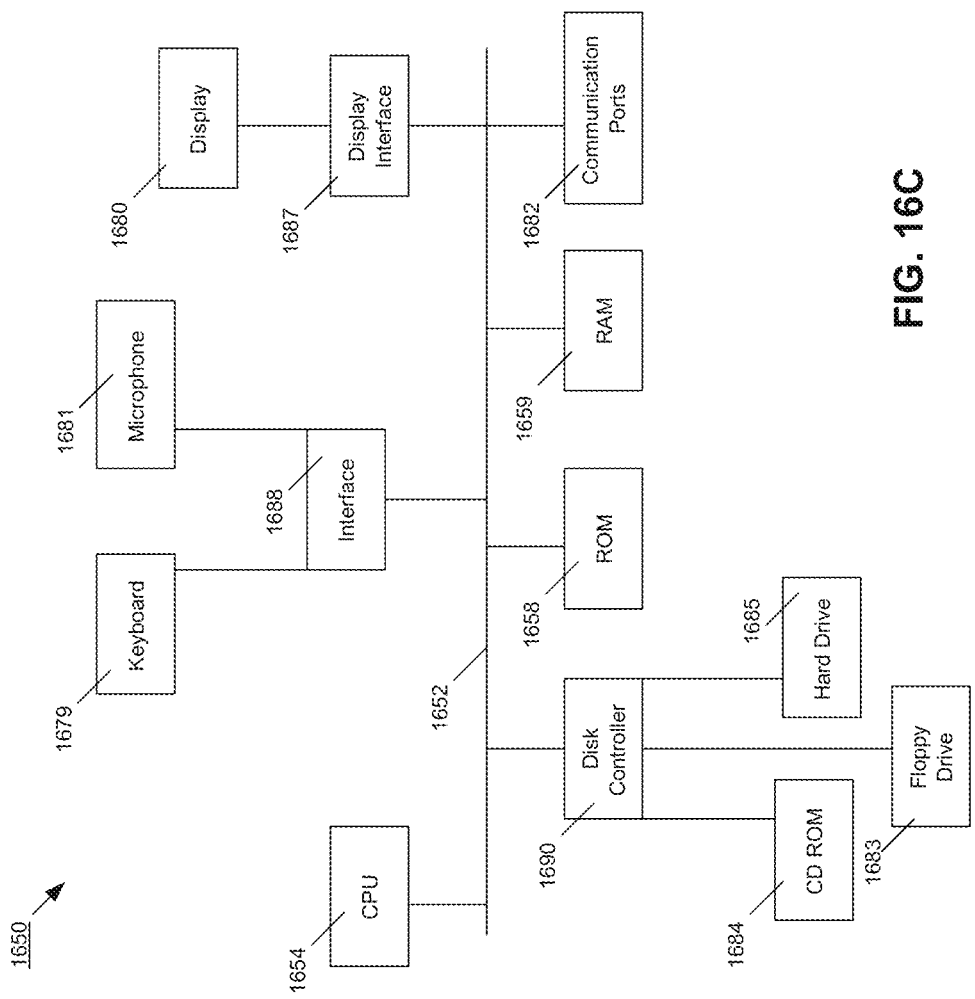

FIGS. 16A, 16B, and 16C depict example systems for implementing the approaches described herein for affective, behavioral, and cognitive processes data collection. For example, FIG. 16A depicts an exemplary system 1600 that includes a standalone computer architecture where a processing system 1602 (e.g., one or more computer processors located in a given computer or in multiple computers that may be separate and distinct from one another) includes a computer-implemented digital recording 1604 being executed on the processing system 1602. The processing system 1602 has access to a computer-readable memory 1607 in addition to one or more data stores 1608. The one or more data stores 1608 may include existing experiments 1610 as well as previously generated tasks 1612. The processing system 1602 may be a distributed parallel computing environment, which may be used to handle very large-scale data sets.

FIG. 16B depicts a system 1620 that includes a client-server architecture. One or more user PCs 1622 access one or more servers 1624 running an appropriate-level digital recording 1637 on a processing system 1627 via one or more networks 1628. The one or more servers 1624 may access a computer-readable memory 1630 as well as one or more data stores 1632. The one or more data stores 1632 may include existing experiments 1634 as well as previously generated tasks 1638.

FIG. 16C shows a block diagram of exemplary hardware for a standalone computer architecture 1650, such as the architecture depicted in FIG. 16A that may be used to include and/or implement the program instructions of system embodiments of the present disclosure. A bus 1652 may serve as the information highway interconnecting the other illustrated components of the hardware. A processing system 1654 labeled CPU (central processing unit) (e.g., one or more computer processors at a given computer or at multiple computers) may perform calculations and logic operations required to execute a program. A non-transitory processor-readable storage medium, such as read only memory (ROM) 1658 and random access memory (RAM) 1659, may be in communication with the processing system 1654 and may include one or more programming instructions for performing the method of generating experiments for an individual. Optionally, program instructions may be stored on a non-transitory computer-readable storage medium such as a magnetic disk, optical disk, recordable memory device, flash memory, or other physical storage medium.

In FIGS. 16A, 16B, and 16C, computer readable memories 1607, 1630, 1658, 1659 or data stores 1608, 1632, 1683, 1684, 1688 may include one or more data structures for storing and associating various data used in the example systems for generating experiments for an individual. For example, a data structure stored in any of the aforementioned locations may be used to store data from XML files, initial parameters, and/or data for other variables described herein. A disk controller 1690 interfaces one or more optional disk drives to the system bus 1652. These disk drives may be external or internal floppy disk drives such as 1683, external or internal CD-ROM, CD-R, CD-RW or DVD drives such as 1684, or external or internal hard drives 1685. As indicated previously, these various disk drives and disk controllers are optional devices.

Each of the element managers, real-time data buffer, conveyors, file input processor, database index shared access memory loader, reference data buffer and data managers may include a software application stored in one or more of the disk drives connected to the disk controller 1690, the ROM 1658 and/or the RAM 1659. The processor 1654 may access one or more components as required.

A display interface 1687 may permit information from the bus 1652 to be displayed on a display 1680 in audio, graphic, or alphanumeric format. Communication with external devices may optionally occur using various communication ports 1682.

In addition to these computer-type components, the hardware may also include data input devices, such as a keyboard 1679, or other input device 1681, such as a microphone, remote control, pointer, mouse and/or joystick.

Additionally, the methods and systems described herein may be implemented on many different types of processing devices by program code comprising program instructions that are executable by the device processing subsystem. The software program instructions may include source code, object code, machine code, or any other stored data that is operable to cause a processing system to perform the methods and operations described herein and may be provided in any suitable language such as C, C++, JAVA, for example, or any other suitable programming language. Other implementations may also be used, however, such as firmware or even appropriately designed hardware configured to carry out the methods and systems described herein.

The systems' and methods' data (e.g., associations, mappings, data input, data output, intermediate data results, final data results, etc.) may be stored and implemented in one or more different types of computer-implemented data stores, such as different types of storage devices and programming constructs (e.g., RAM, ROM, Flash memory, flat files, databases, programming data structures, programming variables, IF-THEN (or similar type) statement constructs, etc.).

It is noted that data structures describe formats for use in organizing and storing data in databases, programs, memory, or other computer-readable media for use by a computer program.

The computer components, software modules, functions, data stores and data structures described herein may be connected directly or indirectly to each other in order to allow the flow of data needed for their operations. It is also noted that a module or processor includes but is not limited to a unit of code that performs a software operation, and can be implemented for example as a subroutine unit of code, or as a software function unit of code, or as an object (as in an object-oriented paradigm), or as an applet, or in a computer script language, or as another type of computer code. The software components and/or functionality may be located on a single computer or distributed across multiple computers depending upon the situation at hand.

While the disclosure has been described in detail and with reference to specific embodiments thereof, it will be apparent to one skilled in the art that various changes and modifications can be made therein without departing from the spirit and scope of the embodiments. Thus, it is intended that the present disclosure cover the modifications and variations of this disclosure provided they come within the scope of the appended claims and their equivalents.

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, can include machine instructions for a programmable processor, and/or can be implemented in a high-level procedural language, an object-oriented programming language, a functional programming language, a logical programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable data processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example as would a processor cache or other random access memory associated with one or more physical processor cores.

The computer components, software modules, functions, data stores and data structures described herein can be connected directly or indirectly to each other in order to allow the flow of data needed for their operations. It is also noted that a module or processor includes but is not limited to a unit of code that performs a software operation, and can be implemented for example as a subroutine unit of code, or as a software function unit of code, or as an object (as in an object-oriented paradigm), or as an applet, or in a computer script language, or as another type of computer code. The software components and/or functionality may be located on a single computer or distributed across multiple computers depending upon the situation at hand.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it is used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." In addition, use of the term "based on," above and in the claims is intended to mean, "based at least in part on," such that an unrecited feature or element is also permissible.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. A computer-implemented method for evaluating a cognition-measuring effectiveness as a task, the method being executed by one or more data processors and comprising:
   receiving, via a graphical user interface, user input designing an experiment for a participant, the experiment configured to administer a computer-implemented task to the participant as part of a think aloud protocol that asks the participant to verbalize their through process while completing the task, the user input specifying each of a plurality of activities forming part of the experiment and transitions between the activities;
   administering the task to the participant through a series of graphical user interface views presented by a software application;
   recording a video of the participant performing the task while concurrently recording screen capture audio and video for the graphical user interface views;
   playing back the video to the participant concurrently with the screen capture audio and video;
   collecting affective, behavioral, and cognitive data from the participant during the playing back by concurrently presenting a series of pre-specified questions while the video and the screen capture audio and video are being played back; and
   rendering at least a portion of the collected affective, behavioral, and cognitive data in the graphical user interface.

2. The method of claim 1, wherein designing the experiment comprises:
   reviewing introductory information;
   making experiment design decisions;
   previewing the experiment;
   publishing the experiment.

3. The method of claim 2, wherein the introductory information comprises:
   an overview of a type of experiment;
   a description of a task in the experiment; and
   available experiment design options.

4. The method of claim 2, wherein the making experiment design decisions comprises:
   selecting channels to record during a performance of a task by the participant;
   selecting the task to record;
   selecting characteristics of a video playback;
   selecting stop points;
   creating stop point questions;
   linking questions to stop points;
   selecting video controls to make available during a playback;
   selecting playback data capture options; and
   selecting pre- and post-task activities.

5. The method of claim 4, wherein selecting channels to record during a performance of a task by a user comprises selecting audio and video channels from a computer and audio and video channels from the participant.

6. The method of claim 4, wherein selecting the task to record comprises selecting either a desktop application or a web-based application.

7. The method of claim 4, wherein selecting characteristics of a video playback comprises selecting either to save the video and not do a playback, or to playback the video.

8. The method of claim 4, wherein selecting stop points comprises selecting one of the following: manual stop points comprising providing information when the participant chooses to stop the playback; automatic stop points comprising providing information at pre-specified points and requiring the participant to provide information in order to resume the playback; and both manual and automatic stop points.

9. The method of claim 8, wherein the automatic stop points comprises stop points of at least one of the following types: stop points occurring at a pre-defined time interval; stop points occurring at pre-defined time points; and stop points occurring at event-based locations.

10. The method of claim 4, wherein creating stop point questions comprises selection of a question type, the question type being one of the following: single-selection multiple-choice; multiple-selection multiple-choice; and open-ended.

11. The method of claim 4, wherein linking questions to stop points comprises assigning the question to the stop point.

12. The method of claim 4, wherein selecting video controls to make available during a playback comprises selecting whether an observer is watching the playback with the participant.

13. The method of claim 4, wherein selecting playback data capture options comprises selecting to capture one or more of the following: an identification of the participant; a stop point label; a stop point time; a stop point question; and a response of the participant.

14. The method of claim 1, further comprising:
   comparing data collected during the playback with data collected from other participants; and
   calculating a scoring metric, the scoring metric indicating an effectiveness of the experiment in assessing cognitive information from the participant.

15. A system for setting up an experiment to collect cognitive data from a participant, comprising:
   one or more data processors; and
   a non-transitory computer-readable medium encoded with instructions for commanding the one or more data processors to execute steps of a process that include:

receiving, via a graphical user interface, user input designing an experiment for a participant, the experiment configured to administer a computer-implemented task to the participant as part of a think aloud protocol that asks the participant to verbalize their through process while completing the task, the user input specifying each of a plurality of activities forming part of the experiment and transitions between the activities;

administering the task to the participant through a series of graphical user interface views presented by a software application;

recording a video of the participant performing the task while concurrently recording screen capture audio and video for the graphical user interface views;

playing back the video to the participant concurrently with the screen capture audio and video;

collecting affective, behavioral, and cognitive data from the participant during the playing back by concurrently presenting a series of pre-specified questions while the video and the screen capture audio and video are being played back; and rendering at least a portion of the collected affective, behavioral, and cognitive data in the graphical user interface.

\* \* \* \* \*